Figure 1:
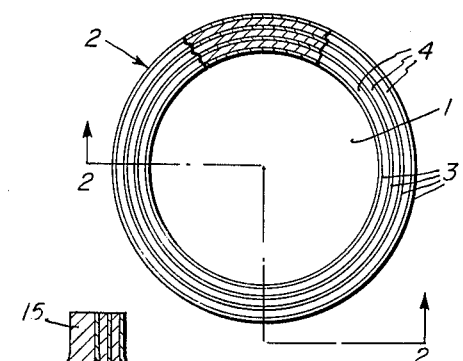

Oct. 19, 1965   R. J. BONDLEY   3,213,184

METAL TO CERAMIC SEALING STRUCTURE

Filed Dec. 11, 1962

Inventor:
Ralph J. Bondley,
by John P. Dellett
His Attorney.

United States Patent Office 3,213,184
Patented Oct. 19, 1965

3,213,184
METAL TO CERAMIC SEALING STRUCTURE
Ralph J. Bondley, Scotia, N.Y., assignor to General Electric Company, a corporation of New York
Filed Dec. 11, 1962, Ser. No. 243,944
11 Claims. (Cl. 174—50.58)

This invention relates to a hermetic metal-to-ceramic seal capable of high temperature cycling, such a seal being particularly applicable to evacuated electron devices.

Joining metal to ceramic is troublesome in high temperature devices especially wherein cycling through a wide temperature range occurs. An adhered joint between a ceramic and a single metal or alloy frequently develops residual stress during high temperature cycling, resulting in a distorted or fractured joint.

Typical ceramics used for high power vacuum tube devices and the like have difficult to match expansion coefficients, e.g. falling in the range of from $6 \times 10^{-6}$ to $10 \times 10^{-6}$ per °C. Alumina, beryllia and steatite exemplify this class. Metals or alloys having identical thermal expansion characteristics are almost non-existent. Nickel-iron and nickel-iron-cobalt alloys have been used as matching metals, but because of rapidly varying expansion produced as the alloy is heated past the Curie point, a good match over a wide temperature excursion, using such materials, is not practical.

It is therefore an object of the present invention to provide an improved, rugged, metal-to-ceramic sealing structure capable of withstanding repeated heating to high temperatures. It is desirable such a seal have high structural strength including features compensating for uneven expansion and structural distortion with high temperature excursion.

It is another object of the present invention to provide a metal structure for matching a selected coefficient of expansion, the metal structure having the property of structural ruggedness with wide temperature excursion.

Briefly stated in accordance with an illustrated embodiment of my invention a metal-to-ceramic sealing structure includes a ceramic member and an at least partially contiguous metal member bonded thereto. The metal member comprises a laminated metal structure or laminate including lamellar layers or laminae respectively exhibiting coefficients of expansion above and below the expansion coefficient of the ceramic member.

According to one aspect of the present invention, the metal member is a laminated metal structure including alternate laminae of metals having expansion coefficients successively above and below that of the ceramic member. In this manner the metal member is arranged to have a resulting coefficient of expansion effectively equal to that of the ceramic member.

According to another feature of the present invention, the number of laminae is an odd number greater than three whereby the laminate is symmetrical and therefore will not have a tendency to distort or bend as the temperature is raised. Assuming a laminate of three laminae, for example, the outside two layers preferably have the same coefficient of expansion, e.g. below that of the ceramic member while the inside lamina has a coefficient of expansion above that of the ceramic member. Although this illustration is helpful in briefly describing the invention, more than three laminae are generally preferred. The overall thickness of the entire laminate is determined by the structural strength and support required at the seal. However the individual laminae are preferably quite thin whereby the entire laminate functions as a single unit, having an effective coefficient of expansion substantially equal to that of the ceramic member. The resultant sealing structure is capable of cycling to high temperatures without fracture of the ceramic or the ceramic metal interface, and without excessive metal member distortion.

In it broader aspects my invention relates to a laminated metal member whose components are chosen to provide a structure with a desired expansion coefficient suitable for matching the expansion coefficient of another body.

Figure 2:
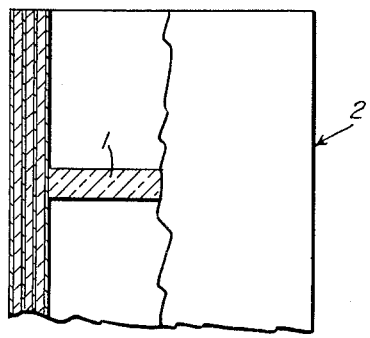
Figure 3:
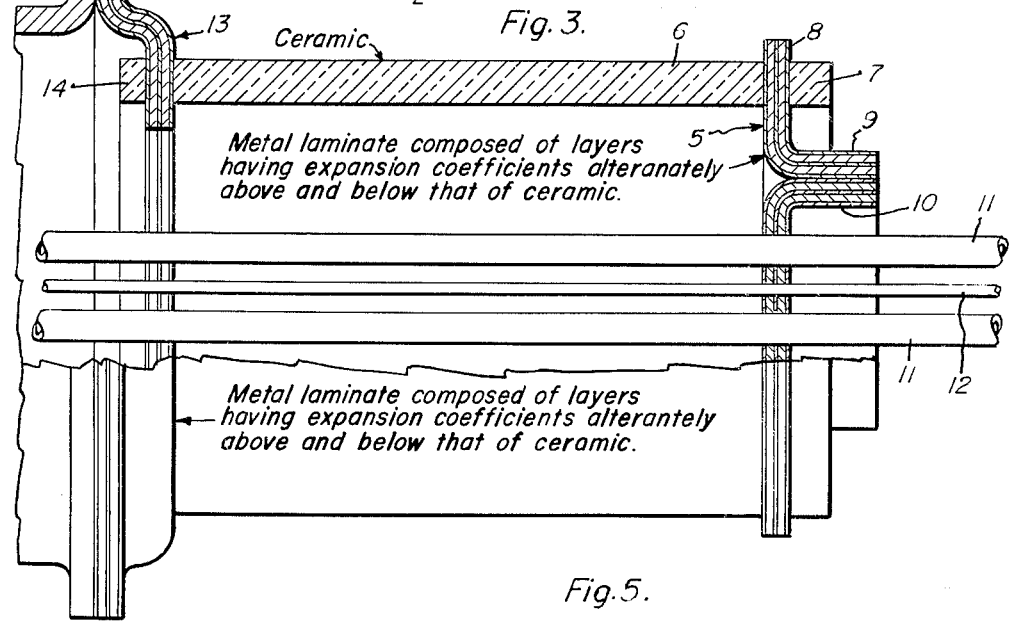
Figure 4:
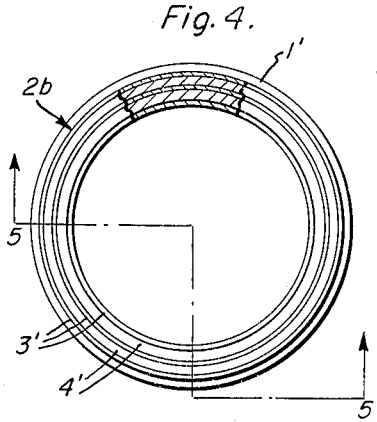
Figure 5:
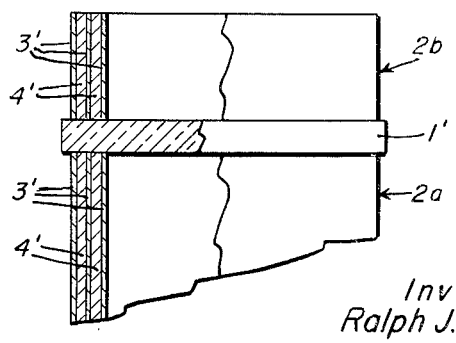

The subject matter which I regard as my invention is particularly pointed out and distinctly claimed in the concluding portion of this specification. The invention, however, both as to organization and method of operation, may best be understood by reference to the following description taken in connection with the accompanying drawings wherein like reference characters refer to like elements and in which:

FIG. 1 is an end cross-section of a first embodiment in accordance with the present invention, FIG. 2 is a longitudinal cross-section of the FIG. 1 embodiment taken at 2—2, FIG. 3 is a longitudinal cross-section comprising a feedthrough insulator structure in accordance with the present invention, FIG. 4 is an end cross-section of another embodiment in accordance with the present invention, and FIG. 5 is a longitudinal cross-section taken at 5—5 in FIG. 4.

The present invention includes a ceramic member with a first coefficient of expansion and a laminated metal member joined thereto preferably comprising an odd numbered plurality of three or more laminae. These laminae are formed of metals exhibiting coefficients of expansion successively greater than, and less than, the coefficient of expansion of the ceramic member. The coefficients of expansion are selected to provide a coefficient of expansion for the metal member matching that of the ceramic member over a wide range of temperatures and the two metal materials desirably have the same modulus of elasticity and yield point with temperature. Since the metal member is generally constructed of an odd number or a large number of laminae, the configuration is symmetrical and balanced with respect to the center lamina and therefore no bending moment is present to distort the structure by forcing it away from the ceramic member. Of course, with a large number of laminae the number thereof need not be odd to provide substantially balanced compensation.

In the embodiment of FIGS. 1 and 2 the central ceramic member, 1, which may be a disc of ceramic material, is engaged in clamping relation by a cylindrical laminated structure, 2, wherein the lamellar surfaces are in general parallel to the axis of the disc. This type of configuration finds utility for example when the central ceramic member 1 comprises low dielectric loss ceramic "window" for passing electromagnetic radiation from one waveguide section to another; in this case cylindrical structure 2 may be secured between the metallic waveguides.

Laminated structure 2 in FIGS. 1 and 2 preferably comprises an odd number of thin individual cylindrical laminae, here illustrated as seven in number. These laminae include four cylindrical laminae, 3, constructed of a first metal, and these are separated by three metal laminae, 4, constructed of a different metal.

Instead of forming the laminated structure 2 of cylindrical laminae, essentially the same cross-section is attainable by spirally wrapping two or more laminae, formed of different metals, around the central ceramic member 1. This alternative is especially adaptable to sealing structures including a large number of thin laminae. Although the number of lamellar layers adjoining any point on the periphery of member 1 may be odd or even in number, substantial balancing of bending moments is achieved.

The ceramic member may be alumina, beryllia, steatite, or other ceramic materials having desirable dielectric properties or the like. The metals employed for the laminae may comprise structural metals having both high and low expansion coefficients including such metals as iron, stainless steel, molybdenum, tantalum and tungsten, as hereinafter more fully described.

The laminae are securely bonded to one another and the innermost lamina 3 is securely bonded to ceramic member 1. The laminae are bonded to one another, for example, by first rolling them as flat sheet, and then forming the composite body together into a cylindrical shape. The inter-lamellar bonding is secured by the pressure exerted in rolling sheet metal laminae together in a manner of pressure welding. The rolling procedure can be accomplished at an elevated temperature whereby the procedure constitutes a hot rolling process. In either event the total thickness of the laminae in the cylinder 2 will be decreased in rolling; therefore it will be necessary initially to construct the laminated structure greater in thickness then finally desired in order that the completed structure, 2, be of the structurally required thickness. The individual laminae may also be secured to one another with a high melting point solder or brazing alloy. For example, the laminae may be readily joined to one another with copper solder at a temperature slightly in excess of 1083° C., titanium-nickel solder including approximately 24.5 atomic percent nickel at a temperature somewhat in excess of 955° C., or gold-palladium alloys with melting points above 1200° C.

The cylinder or frame 2 may be bonded to the periphery of the central ceramic member 1 using an active metal soldering technique. Briefly and by way of example, the peripheral edge of the central ceramic member is first coated with a thin layer of titanium hydride. Powdered titanium hydride is suspended in a liquid such as amyl acetate and a fugitive binder such as nitro cellulose. A suitable solder alloy such as a thin sheet of the eutectic of silver and copper, is wrapped around the coated periphery and the ceramic is positioned snugly in the frame 2 as with a hydraulic press. The structure is then heated in a non-reactive atmosphere to a temperature of approximately 800° C., whereupon the solder melts to produce a bond between ceramic and frame.

The cylinder may also be bonded to the ceramic member in the manner set forth and claimed in my copending application, Serial Number 741,713, now Patent Number 3,100,339, filed June 11, 1958, and assigned to the assignee of the present invention.

In accordance with an important aspect of the present invention the laminae 3 are formed of a metal having a first coefficient of expansion for example a coefficient of expansion greater than that of the central ceramic member and laminae 4 are formed of a metal having a second coefficient of expansion, e.g. the coefficient of expansion less than that of the ceramic member. In this manner the laminated structure, 2, can be arranged to match the expansion coefficient of the ceramic member, 1. The two materials desirably have similar moduli of elasticity and yield point. If their moduli are quite different, then the thickness ratio should be adjusted in favor of the weaker metal.

By way of specific example in determining the thickness of particular laminae, consider a central ceramic member 1 formed of alumina and a laminated structure 2 formed of alternate laminae of tantalum and type 430 stainless steel. The thermal coefficient of expansion of alumina over a wide temperature range is $7.9 \times 10^{-6}$ per °C. Over the same temperature range, tantalum is $6.5 \times 10^{-6}$ and the stainless steel is $10.5 \times 10^{-6}$.

If we let $x$=the thickness of the stainless steel and $y$=the thickness of tantalum, then $x+y=T$, total thickness. The total expansion of $T$ is to be the same as alumina.

Thus $(10.5x+6.5y)10^{-6}=7.9(T)10^{-6}=7.9(x+y)10^{-6}$

Solving, $x=.54y$ and $T=1.54y$.

The laminated metal would then be approximately 65% tantalum, and 35% type 430 stainless steel. If a laminated structure, 2, of laminated metal, 0.03″ in thickness is desired, the stainless steel would occupy 0.0105″ of thickness and the tantalum would occupy 0.0195″ of thickness. Assuming a seven-laminae structure, the stainless steel could then comprise four sheets, each 0.0026″ in thickness and the tantalum would comprise three sheets, each 0.0065″ in thickness. In the reverse situation where laminae indicated by reference numeral 3 are tantalum and laminae indicated by reference number 4 are stainless steel, the laminae 3 may be 0.005″ in thickness and the laminae 4 would be 0.0035″ in thickness.

It is to be observed that the final laminated cylindrical structure, 2, matches the coefficient of expansion of the central ceramic member without the occurrence of undue creep or distortion on cycling to relatively high temperatures. The closer the characteristics of each of the metals in the laminate are to the final product and the thinner the metal layers, the lower will be the creep experienced. It is again to be noted the structure is substantially symmetrical, so that no appreciable bending moment is present as in the case of an ordinary bimetallic strip. The metal-to-ceramic sealing structure can be repeatedly cycled to temperatures of approximately 600° C. without fracture of the ceramic member or objectionable permanent distortion of the overall structure.

Another example of laminate calculation may be considered for a laminate including metal laminae formed of molybdenum, having a coefficient of expansion of $5.7 \times 10^{-6}$, and iron having a coefficient of expansion of $12.9 \times 10^{-6}$, to match beryllia having an expansion coefficient of $8.5 \times 10^{-6}$. The total change in the laminate is $T(12.9x+5.7y)10^{-6}$. This must equal $T(8.5)(x+y)10^{-6}$ the size change of the beryllia.

Solving, $12.9x+5.7y=8.5x+8.5y$. Therefore $x=63.5$ percent of $y$. But $x+y=T$ the thickness of the laminate. They $y+0.635y=T$, and $$y=\frac{T}{1.635}$$

Thus, $y$, the molybdenum thickness=61.5 percent of the laminate, and $x$, the iron thickness=38.5 percent of the laminate. An odd number of layers can then be chosen, the combined thickness of which is equal to the structural thickness desired for the metal member.

FIG. 3 illustrates an embodiment of the present invention which may be incorporated as a "feedthrough" insulating structure in high power, high frequency electronic devices of vacuum tube type, e.g. in high power klystron amplifying tubes. Such devices are frequently operated at high temperatures for intermittent periods of time. Although standardly formed of metal, the very high voltages present in these tubes require use of ceramic insulating members for passing electrical and coolant connections.

In the FIG. 3 embodiment a flange portion 8 of a laminated circular metal member 5 is joined to a ceramic cylinder, 6, through the use of an adherent substance as hereinbefore set out. The laminated metal member is comprised of five symmetrically arranged laminae in this embodiment. The metal member 5 is formed of materials balanced to match the expansion coefficient of the ceramic member 6 as also hereinbefore set forth. A ceramic ring 7 for providing further balance is adhered to the outer surface of flange 8, opposite cylinder 6.

In the particular embodiment illustrated, metal member 5 is formed to provide a central cylindrical portion 9, extending outwardly away from the ceramic cylinder 6. This extension is bonded, as by copper soldering, to a further cup-shaped metallic member 10, also conveniently formed as a laminated structure similar to member 5. The cup-shaped member 10 is apertured to accommodate passage of cylindrical coolant connections 11 and electrical connection 12, securely joined to cup-shaped member 10 to complete a vacuum tight construction.

The remaining end of ceramic cylinder 6 is adhered to the inner aperture of a double-flanged laminated circular metal member 13. Member 13 is conveniently formed of the same alternate metal laminae as member 8, being five in number, providing a balanced expansion match to cylinder 6. A further ceramic stress balancing ring 14, formed of the same material as the cylinder is secured to the member 13 on the side thereof immediately opposite cylinder 6. Member 13 is soldered at its outer circumference to a metal flange 15 attached to a high power microwave amplifying device.

Although such a device is constructed, baked out, and operated at very high temperatures with frequent temperature cycling, the metal-to-ceramic feedthrough arrangement is found to provide desirable insulating properties for connections 11 and 12, without occasioning stress sufficient to result in fracture or distortion of the feedthrough structure.

The embodiment of FIGS. 4 and 5 may serve the same function as the embodiment of FIGS. 1 and 2 and is substantially identical as respects like reference numerals. In this embodiment, the ceramic member 1' serves as a "window" for transmitting electromagnetic radiation between a first laminated cylindrical metal section 2a and a second cylindrical section 2b. The ceramic member has at least as large an outside diameter as the laminated metal cylindrical member, so the laminated ends of sections 2a and 2b abut the central ceramic member 1' where they are secured to the central member by the aforementioned bonding procedure.

In the present embodiment, each cylindrical section comprises five laminae including three laminae indicated by the reference numeral 3', formed of a first metal material, separated by two intermediate laminae 4', which are formed of a second metal material. As before, the first and second metal materials have coefficients of expansion above and below that of the ceramic member and of a value for substantially matching the expansion coefficient of the ceramic member. Also as in the previous embodiments, the laminate is substantially balanced to compensate or eliminate bending moments tending towards distortion of the metal portion of the structure.

It is apparent that the embodiment of FIGS. 4 and 5 with some modification may be used as a feedthrough in the manner of the FIG. 3 embodiment, as by providing an aperture in member 1'. Alternatively member 1' may comprise a ceramic cylinder supported between and/or within cylindrical sections 2a and 2b.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A sealing structure comprising a ceramic body exhibiting a first coefficient of expansion below $10 \times 10^{-6}$ per degree C. and a metal member joined thereto, said metal member including a plurality of at least three contiguously bonded substantially rigid sheet metal laminae comprising a laminate wherein successive laminae have coefficients of expansion alternately above and below the expansion coefficient of said body in proportion for matching the expansion coefficient of said body, said body being bonded to at least one of said laminae.

2. A metal-to-ceramic sealing structure comprising a ceramic member exhibiting a first coefficient of expansion below $10 \times 10^{-6}$ per degree C., a metal member joined thereto, and sealing means contiguously adhering said metal member to said ceramic member, said metal member comprising a laminate formed of a plurality of at least three laminae including a center lamina having a coefficient of expansion differing from the expansion coefficient of the ceramic member in a first sense, and two laminae on either side of said center lamina having coefficients of expansion both differing from the expansion coefficient of said ceramic member in the opposite sense, wherein the coefficient of expansion of one of said two metals multiplied by its total thickness in said laminate and added to the coefficient of expansion of the other of said two metals multiplied by its total thickness in the laminate substantially equals the coefficient of expansion of said ceramic member multiplied by the total thickness of said laminate.

3. A metal-to-ceramic sealing structure comprising a ceramic member having a first coefficient of expansion below $10 \times 10^{-6}$ per degree C., and a sheet metal laminate bonded to the ceramic member comprising an annular flanged metal member for joinder to another metal, said metal member comprising a plurality of at least three laminae formed of two different metals, including a first lamina of a first metal having a first coefficient of expansion less than the expansion coefficient of said ceramic member, and including second and third laminae on either side of said first lamina and formed of a second metal having a coefficient of expansion greater than the expansion coefficient of said ceramic member in proportion for matching the expansion coefficient of said ceramic member.

4. A metal-to-ceramic sealing structure comprising a ceramic member having a first coefficient of expansion, and a metal member bonded thereto, said metal member comprising a plurality of at least three laminae formed of two different metals, including first laminae formed of tantalum having a coefficient of expansion less than the expansion coefficient of said ceramic member, and including second laminae formed of stainless steel having a coefficient of expansion greater than the expansion coefficient of said ceramic member and in proportion for matching the expansion coefficient of said ceramic member, wherein said second laminae alternate with said first laminae to provide a symmetrically compensated laminate.

5. A metal-to-ceramic sealing structure comprising a ceramic member formed of alumina having a first coefficient of expansion, and a metal member bonded thereto, said metal member comprising a plurality of at least three laminae formed of two different metals, including first laminae formed of tantalum having a coefficient of expansion less than the expansion coefficient of said ceramic member, and including second laminae formed of stainless steel having a coefficient of expansion greater than the expansion coefficient of said ceramic member and in proportion for matching the expansion coefficient of said ceramic member, wherein said second laminae alternate with said first laminae to provide a symmetrically compensated laminate.

6. A metal-to-ceramic sealing structure comprising a ceramic member having a first coefficient of expansion and a metal member bonded thereto, said metal member comprising a plurality of at least three laminae formed of two different metals, including first laminae formed of molybdenum having a coefficient of expansion less than the expansion coefficient of said ceramic member, and including second laminae formed of iron having a coefficient of expansion greater than the expansion coefficient of said ceramic member and in proportion for matching the expansion coefficient of said ceramic member, wherein said second laminae alternate with said first laminae to provide a symmetrically compensated laminate.

7. A metal-to-ceramic sealing structure comprising a ceramic member formed of alumina having a first coefficient of expansion and a metal member bonded thereto, said metal member comprising a plurality of at least three laminae formed of two different metals, including first laminae formed of molybdenum having a coefficient of expansion less than the expansion coefficient of said ceramic member, and including second laminae formed of iron having a coefficient of expansion greater than the expansion coefficient of said ceramic member and in proportion for matching the expansion coefficient of said ceramic member, wherein said second laminae alternate with said first laminae to provide a symmetrically compensated laminate.

8. A metal-to-ceramic structure comprising a ceramic member having an outer periphery and characterized by a first coefficient of expansion below $10 \times 10^{-6}$ per degree C.; an outer annular metal member joined thereto around the periphery of said ceramic member, and sealing means for adhering said metal member to said ceramic member, said metal member comprising a laminate of a plurality of at least three contiguously bonded substantially rigid sheet metal laminae wherein successive laminae are formed of two metals having coefficients of expansion alternately above and below the expansion coefficient of said ceramic member proportioned for matching the expansion coefficient of said ceramic member.

9. The structure according to claim 8 wherein the lamellar surfaces of said laminae are substantially parallel to the axis of the periphery of said ceramic member and form a cylinder joined around the periphery of said ceramic member.

10. A metal-to-ceramic sealing structure comprising a ceramic member exhibiting a first coefficient of expansion below $10 \times 10^{-6}$ per degree C., and a metal member joined thereto, said metal member comprising a laminate formed of a plurality of at least three contiguously bonded substantially rigid sheet metal laminae including laminae formed of metals exhibiting differing expansion coefficients for imparting to said laminae coefficients of expansion alternately above and below the expansion coefficients of said ceramic member, for matching the expansion coefficient of said ceramic member wherein one of said three laminae has a coefficient of expansion differing from the expansion coefficient of said ceramic member in a first sense, and second and third of said three laminae disposed on either side of said one of said laminae have coefficients of expansion differing from the expansion coefficient of said ceramic member in the opposite sense, the ceramic member abutting the edge of said laminae, and sealing means for adhering said metal member to said ceramic member.

11. The structure according to claim 10 wherein said laminae comprise contiguous concentric cylinders of varying diameter to form a cylindrical conduit, and wherein the ceramic member abuts the edge of said laminae to close off said conduit.

References Cited by the Examiner

UNITED STATES PATENTS

| 1,498,908 | 6/24 | Fink | 174—50 |
|---|---|---|---|
| 2,504,522 | 4/50 | Greiner | 174—50 |
| 2,798,577 | 7/57 | La Forge | 220—2 X |
| 2,859,372 | 11/58 | Stangl. | |
| 2,915,153 | 12/59 | Hitchcock | 174—50 X |
| 3,020,456 | 2/62 | Layton et al. | 317—258 |
| 3,023,492 | 3/62 | Bristow | 29—195 |
| 3,115,957 | 12/63 | Heil | 189—36 |

FOREIGN PATENTS 836,919   6/60   Great Britain.

JOHN F. BURNS, *Primary Examiner.*

JOHN P. WILDMAN, DARRELL L. CLAY, *Examiners.*